United States Patent [19]

d'Alayerde Costemore d'Arc

[11] Patent Number: 5,010,428
[45] Date of Patent: Apr. 23, 1991

[54] TILTING OPTICAL DISC LOADING MECHANISM WITH AUTOMATIC CENTERING AND EJECTION OF DISCS OF DIFFERENT DIAMETERS

[75] Inventor: Stephane M. d'Alayerde Costemore d'Arc, Brussels, Belgium

[73] Assignee: Staar S.A., Belgium

[21] Appl. No.: 412,478

[22] Filed: Sep. 26, 1989

[30] Foreign Application Priority Data

Nov. 17, 1988 [BE] Belgium .............................. 8801303

[51] Int. Cl.⁵ ............................................. G11B 17/04
[52] U.S. Cl. ............................. 360/99.06; 360/99.02; 369/75.2
[58] Field of Search .......................... 360/99.06, 99.02; 369/75.1, 75.2, 77.1, 176

[56] References Cited

U.S. PATENT DOCUMENTS

| | | | |
|---|---|---|---|
| 4,498,162 | 2/1985 | Schatteman | 369/77.1 |
| 4,510,591 | 4/1985 | Schatteman | 369/77.1 |
| 4,523,306 | 6/1985 | Staar | 369/77.1 |
| 4,674,079 | 6/1987 | Agostini | 369/77.1 |
| 4,839,880 | 6/1989 | de Costemore | 369/75.2 |

FOREIGN PATENT DOCUMENTS 0296829 12/1988 European Pat. Off.

Primary Examiner—David J. Severin
Attorney, Agent, or Firm—Leydig, Voit & Mayer

[57] ABSTRACT

A disc player/recorder apparatus for loading. centering and ejecting optical discs. The apparatus has a horizontal spindle for operating the disc in a vertical plane and a pivotal door, and is operative with discs of different diameters.

24 Claims, 5 Drawing Sheets

TILTING OPTICAL DISC LOADING MECHANISM WITH AUTOMATIC CENTERING AND EJECTION OF DISCS OF DIFFERENT DIAMETERS

The present invention relates to a disc loading and unloading mechanism of the type using a pivoting loading door and, in particular, to such a mechanism incorporating an automatic centering and ejecting mechanism operative with optical discs of different diameters.

BACKGROUND ART

Owing to the high sensitivity of optical disc surfaces to finger prints or scratches, it is of the utmost importance to handle optical discs with the greatest care and, therefore, place in or remove these optical discs from player/recorder apparatus loading mechanisms by holding them by their edge and center hole only.

Existing loading mechanisms for discs of different size are so cumbersome that their mechanisms cannot readily be incorporated in a slim pivotally mounted loading door, making the adaptation to a conventional single size record player rather difficult if not impossible.

In order to overcome such drawbacks, it is a principle object of the invention to provide a simple, reliable, easy-to-operate mechanism which is particularly adaptable to recorder/player units where the loading and unloading of discs is provided by means of a pivoting door.

Another object of the invention is to provide such a loading mechanism for discs of at least two different diameters which does not increase the door thickness substantially, so that the loading mechanism may be incorporated in existing "single diameter" recorder player units without requiring significant structural or size alterations.

A further object of the invention is to provide a loading mechanism which is adaptable to existing laser pickups of different translation paths during the disc playback operation.

Another object of the invention is to use the existing parts, commonly found in any optical disc player/recorder, like the disc clamping device, in order to reach the objectives of the present invention without adding redundant, encumbering and expensive new parts.

Another object of the invention is to associate and synchronize these existing parts such as the disc clamping device with a translating device for discs of at least two different diameters in order to ease the loading and unloading operation. In order to be operable by users, the mechanism of this invention should not provide any difficulty in use.

SUMMARY OF THE INVENTION

To achieve the foregoing objects, the present invention includes a loading and unloading mechanism having a pivotally mounted disc loading member providing a loading surface for receiving a large diameter disc in an introduction plane, a guide limiting the lateral movement of the large diameter disc during its translation from its introduction plane to its operating plane, and conversely upon pivotal movement of the disc support member, a clamping device ensuring the clamping of the disc on the motor spindle, which clamping device rotates freely with respect to the loading surface and has limited perpendicular displacement with respect to the loading surface, and positioning elements on the surface of the disc support member which locate a small diameter disc during the loading operation and position the disc on the loading spindle when the disc is translated from its loading plane to its operating plane.

BRIEF DESCRIPTION OF THE DRAWINGS

Additional features and advantages of the invention will become evident from the following detailed description of preferred embodiments of the invention taken in conjunction with the drawings in which.

DETAILED DESCRIPTION OF BEST MODE

Figures 1, 2:
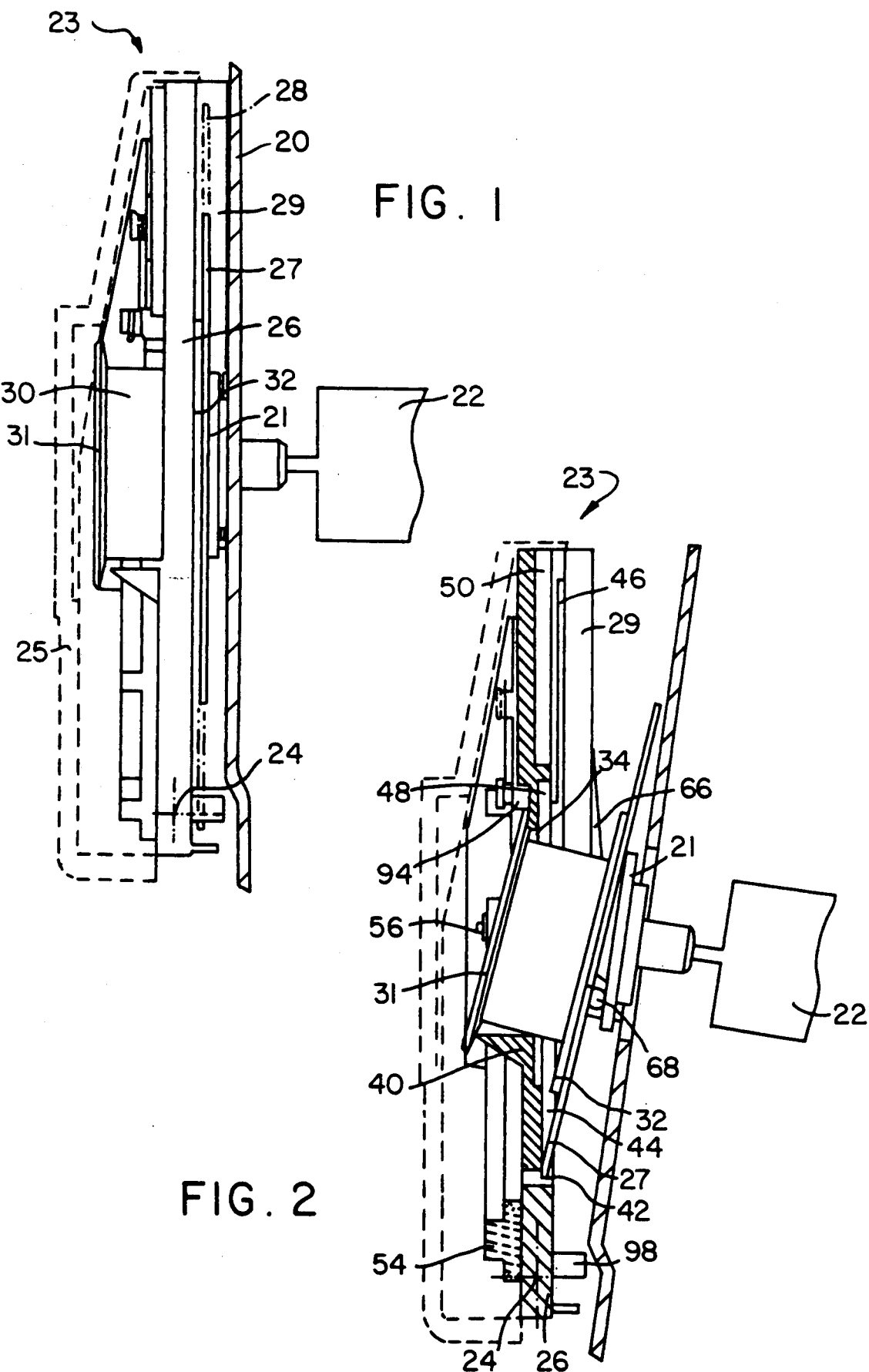
FIG. 1 is a side view of the loading and unloading mechanism wherein a disc is positioned in operating position in a vertical operation plane, which mechanism is provided with a protective cover shown in phantom dashed lines.
FIG. 2 is a sectional side view of the device taken along the plane of lines 2—2 in FIG. 3, and represents the mechanism in an intermediate position in which the clamping device is still in contact with the disc surface and forcing the disc to a tilted position opposite to that of the loading door or member, in this Figure a small sized disc (e.g. 8 cm).

A CD player/recorder unit is schematically represented in FIG. 1 and comprises a fixed body frame 20 on which are mounted conventional disc playback means, schematically represented by a spindle 21 actuated by a motor 22.

A disc support member herein called a door 23 for loading, unloading and centering of discs, is pivotally mounted with respect to the body frame 20, for movement about the pivot 24.

The door 23 is provided with a protective cover 25, represented in dashed lines, which protects the loading and unloading mechanism.

The pivoting of the door 23 with respect to the body frame 20 can advantageously be assisted with a damping device (not shown) in order to obtain a regular and progressive movement.

The door 23 provides a loading surface 26 which is intended to receive a large diameter disc 28. This loading surface 26 is cut out in such a way that it offers a slight V profile, in order to ease the sliding of the disc and to avoid any scratching of its surface. Further explanation of and the characteristics of such a V profile is found in the commonly assigned U.S. Pat. No. 4,510,591. The disc support member is also provided with lateral guides 29 which guide and limit the lateral displacement of a large diameter disc 28 (e.g. diameter 12 cm).

Figure 4:
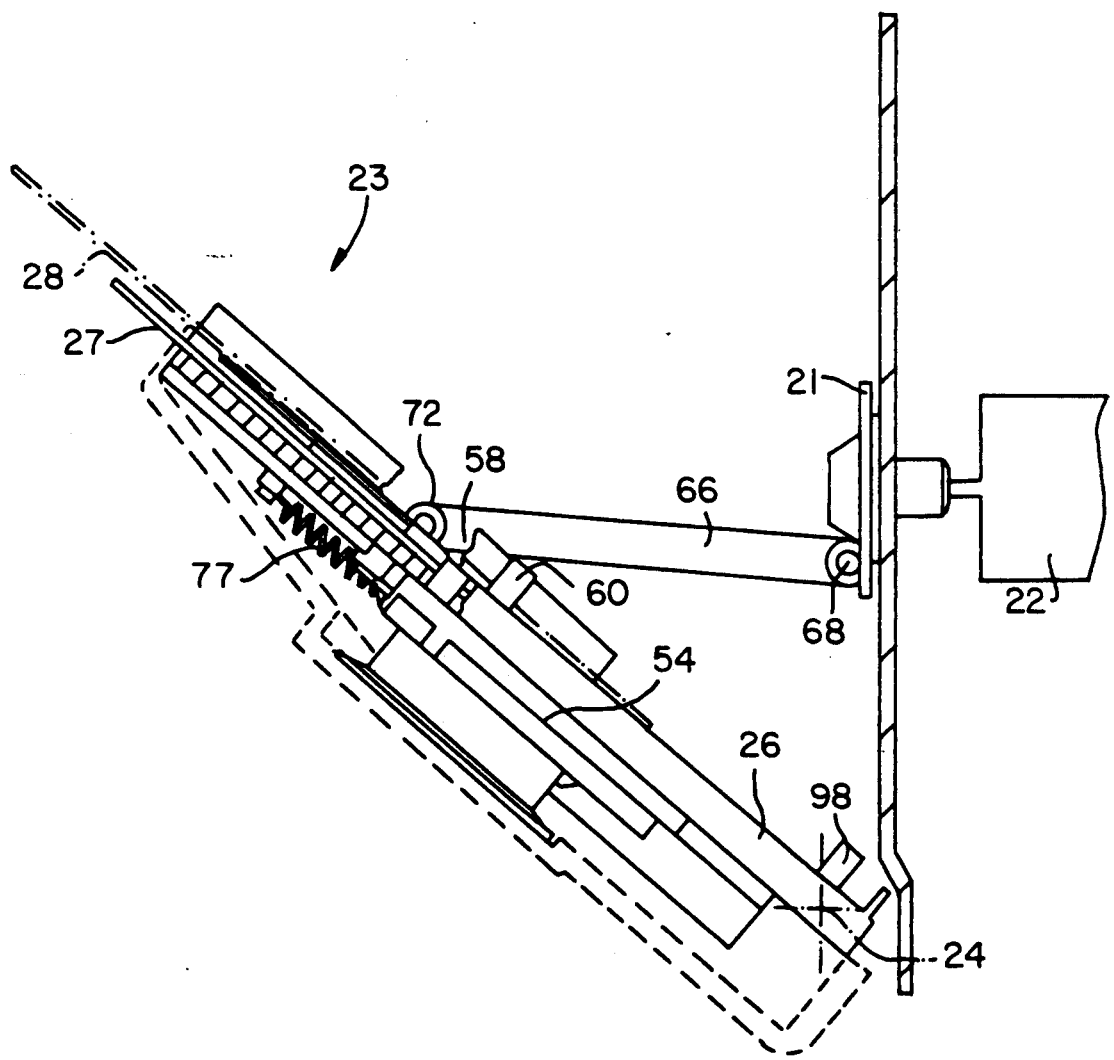
FIG. 4 is similar to FIG. 1 but represents the mechanism in the loading or unloading position.

In operating position, as shown in FIG. 1, disc such as either a small diameter disc 27 or a large diameter disc 28 is held clamped on the motor spindle 21 by a clamping mechanism which in the present embodiment comprises a cylinder 30 containing a magnet, a ring 31, and a clamping plate 32 which cooperates with the disc surface and whose cavity fits on the motor spindle cone (see FIG. 4). The cylinder 30 is free to rotate when in operating position of the mechanism within and without contacting a circular opening 34 located in the center of the door surface 26 and is held from falling when in the loading or unloading position by the ring 31 and the clamping plate 32 which have a diameter larger than the circular opening 34.

FIG. 2 illustrates the door 23 in an intermediate position, during opening. A stop 40 formed in the loading surface 26 on which the lower part of the ring 31 leans, forces the clamping mechanism to tilt in the opposite direction to the loading surface 26 in order to bring the lower part of the disc 27, which gently slides on the cone of the motor spindle 21, to lean on a shoulder 42 adjacent to a U-shaped recess 44 formed in the loading surface 26 of the door 23.

The dimensions of this recess 44 correspond to the diameter of a small disc 27 (FIG. 7) and the lateral walls of the recess 44 are cut out in the loading surface 26 so as to guide the disc 27 all along its path as it moves from the loading position to its operating position and returns to the loading position when ejected. The plane of movement of a small disc 27 is parallel to the plane of movement of a large disc 28 as shown in FIG. 6.

Figure 6:
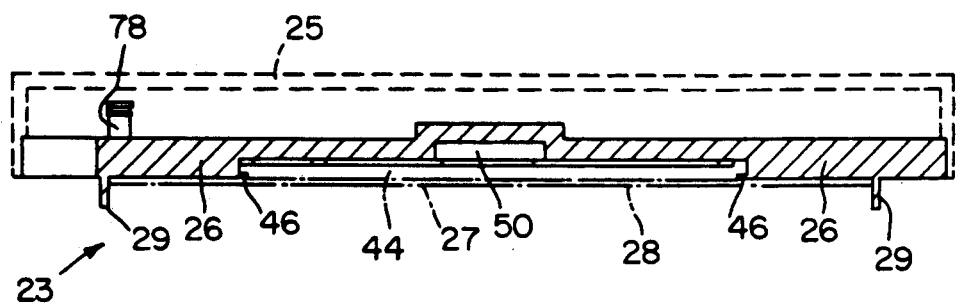
FIG. 6 is a sectional view taken along the plane of lines 6—6 in FIG. 5 and represents the different planes in which different size discs are supported by the surface of the pivotally supported member.
Figure 7:
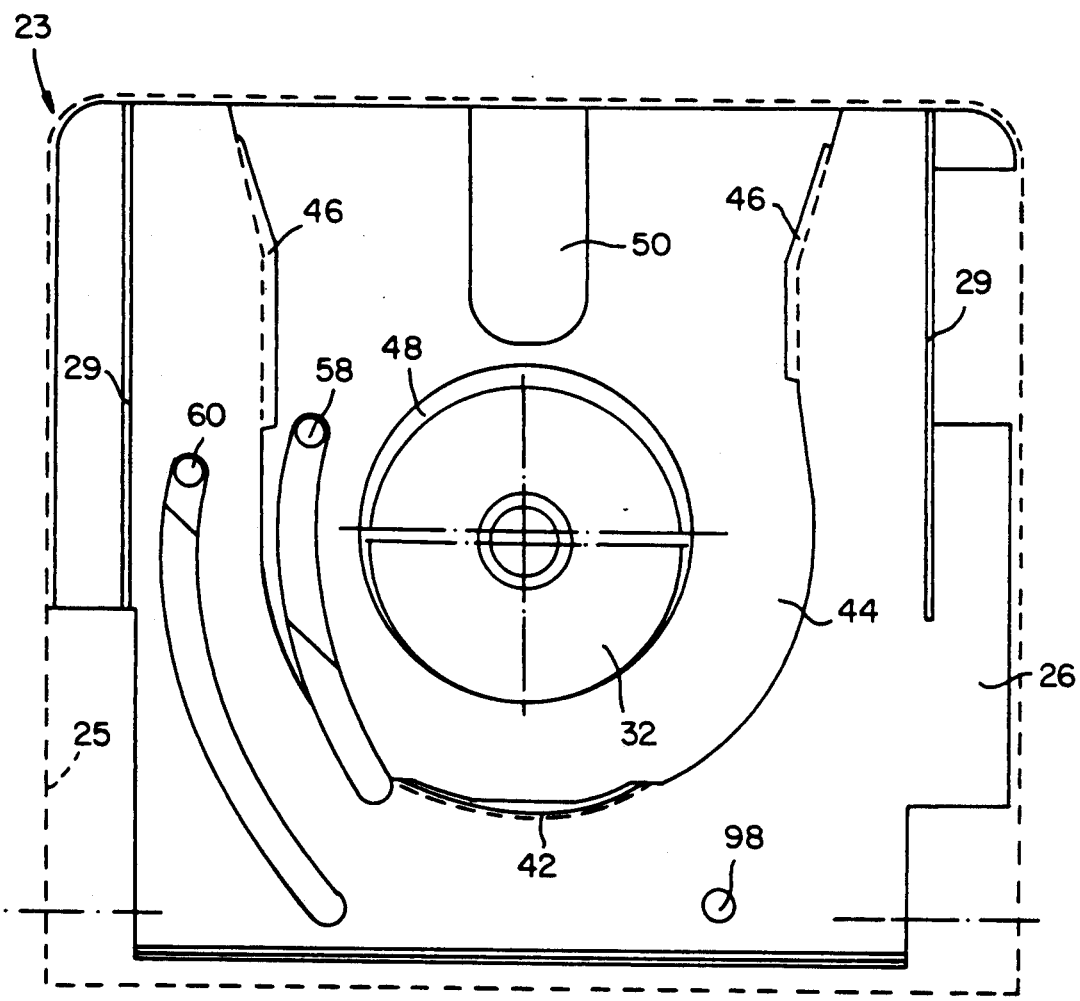
FIG. 7 is a front view taken from the opposite side as seen in FIG. 5, omitting the disc for the sake of simplicity.

Small lips 46 are advantageously provided on each edge of the loading surface 26 in order to limit the disc movement laterally and guide the disc along the surface 26 during the pivotal movement of the door 23 (FIGS. 6 and 7).

Figure 3:
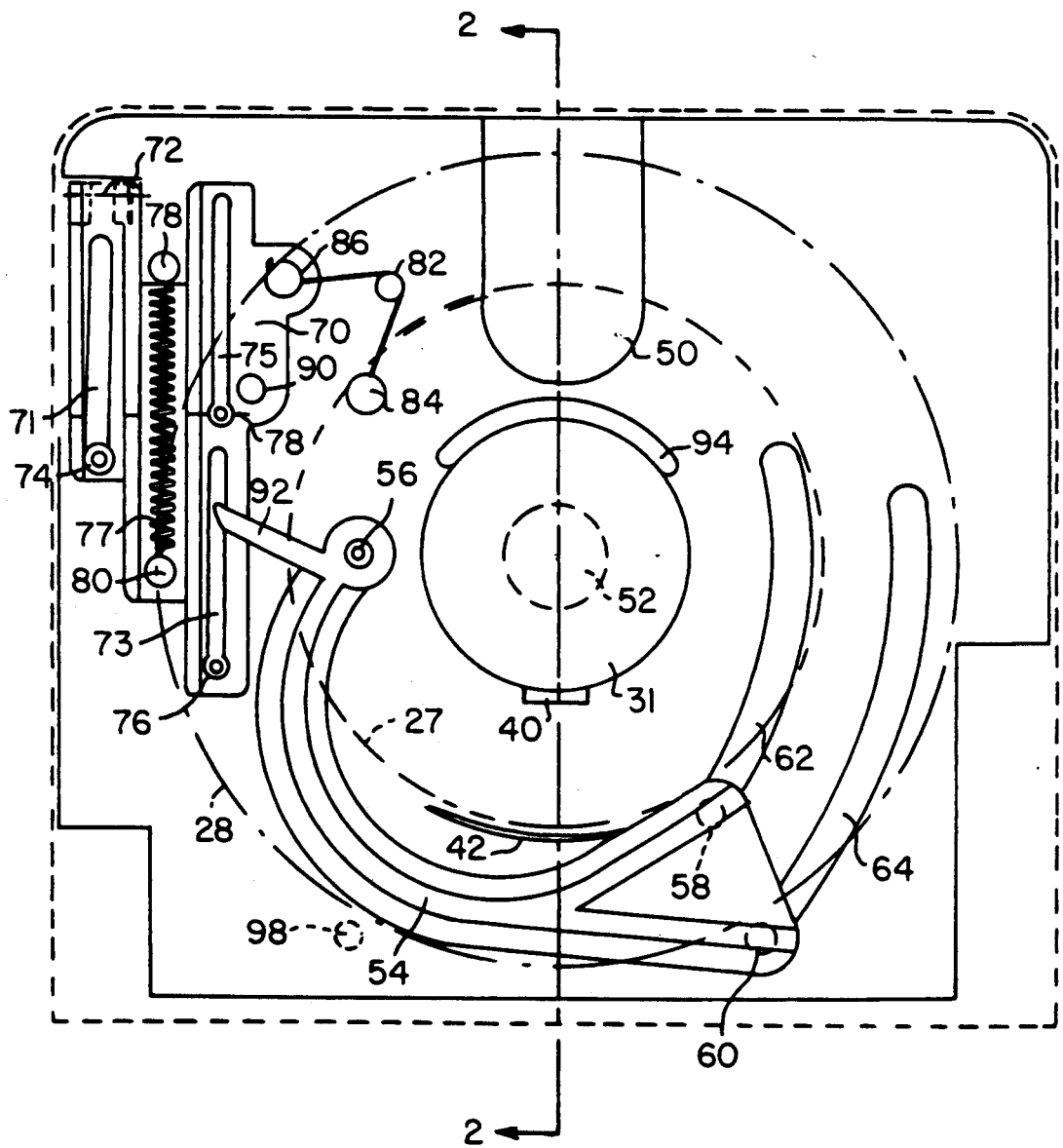
FIG. 3 is a front view of the disc loading and unloading mechanism with the loading door in vertical position and the cover shown in phantom, and the disc in operating position.
Figure 5:
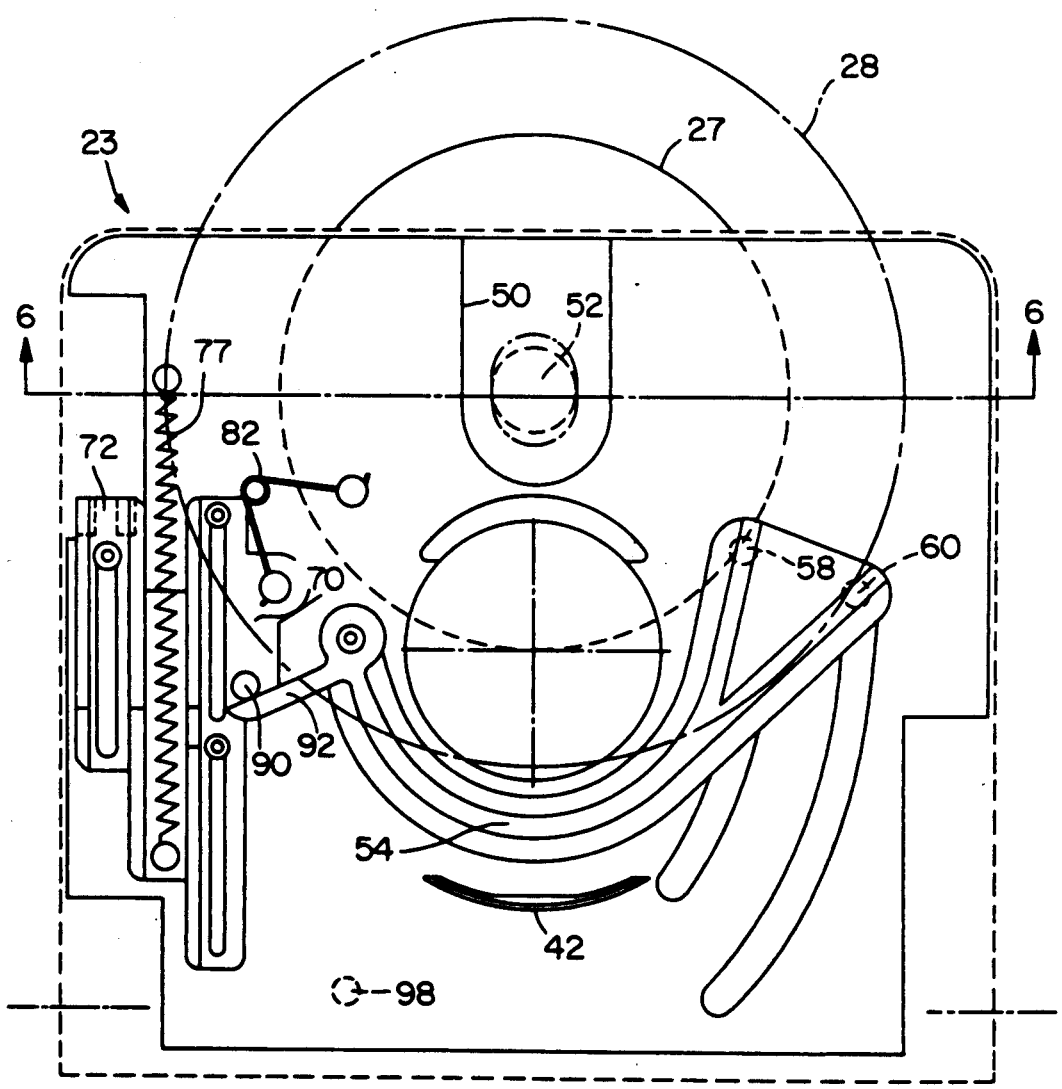
FIG. 5 is similar to FIG. 3 but represents the mechanism as it appears in a loading or unloading position.

A circular recess 48 is provided in the U-shaped recess 44, in order to receive the clamping plate 32 upon return of the clamping means to the loading surface 26 (FIG. 3). As illustrated in FIGS. 3, 5 and 7 a large slot 50 is cut into the upper part of the recess 44 and eases the introduction by a user of a finger in the central hole 52 of the disc in order to pick it up more easily (see FIG. 5).

A curved lever 54 is also illustrated in FIG. 3 which pivots around an axis 56 and slides against the outer-side of the door 23 as opposed to the inner-side of the door 23 containing the loading surface and recess 44. An extremity of the lever 54 bears two studs 58, 60 which protrude through slots 62, 64 in the loading surface 26, to cooperate with the periphery of different diameter discs (stud 58 for a small diameter disc 27, stud 60 for a large diameter disc 28). In order to allow the large disc to slide along the loading surface, the stud 58 is shorter than the stud 60 so that it projects far enough to contact the bottom edge of the small diameter disk 27 without interfering with the larger diameter disc 28.

A rod 66 (see FIG. 4) held on the body frame 20 by a pin 68, actuates the translation of a sliding member 70 (see FIG. 3 and 5) by means of a connecting pin 72.

This sliding member 70 is held and guided by three studs 74, 76 and 78, which are mounted on the loading surface 26, and protrude through slots 71, 73 and 75 in the surface of the sliding member 70.

The sliding member 70 is resiliently forced by a biasing spring 77, which is also used for damping the opening movement of the door 23. The biasing spring 77 tends to bring the sliding member 70 into an upper position (FIG. 3) and is anchored to the surface 26 by a stud 78 and to the sliding member 70 by another stud 80.

A flat hair spring 82 connected at one end on the loading surface 26 by a stud 84 and at its other end to the sliding member 70 by a stud 86 provides dual action during the translation of the sliding member 70 from the position at FIG. 3 to the position represented at FIG. 5. Firstly, it opposes the force generated by the rod 66 and thus slows down the translation and therefore the pivotal movement of the door 23. Then in a second phase it adds its action to the rod 66 for reinforcing the translation and ensuring simultaneously the pivoting of the door 23 and the upward ejecting movement of the disc 27 or 28. A stud 90 mounted on the sliding member 70 actuates the pivoting of the lever 54 by pushing on an arm 92.

A crescent shaped depression 94 placed on the upper part of the circular opening 34 on the lever bearing face of the loading surface 26 allows obtaining a larger pivotal movement of the ring 31 resulting in a further pivotal movement of the disc 27 in a direction opposed to the direction of pivotal movement of the loading surface 26.

FIG. 4 illustrates the fully open position of the door 23, the movement of which is limited by the clearance amplitude of the rod 66 and the sliding member 70. The sliding member 70, the lever 54 and the disc 27 or 28 are then in a position illustrated in FIG. 5, the clamping mechanism having returned substantially to the plane of the loading surface 26 after a tilting movement powered by its own weight.

The operation of the mechanism for a small diameter disc 27 will now be described.

With the door 23 open (FIGS. 4, 5 and 7), the user places the disc 27 in the upper portion of the U-shaped recess 44, with the edge of the disc engaging the stud 58.

The door 23 may then be pivoted to bring the disc 27 into its operating position (FIG. 1). During this movement, the biasing spring 77 moves the sliding member 70 to the position illustrated at FIG. 3. Therefore, the lever 54, forced down by the disc weight, pivots in a clockwise direction and leaves the edge of the disc 27 on the shoulder 42. During this movement, the small lips 46 of the loading surface 26 ensure that the sliding disc remains almost parallel with the loading surface 26.

The disc is further centered and held on the rotating spindle 21 by the operation of the conventional clamping mechanisms 30, 31, 32 (see FIGS. 1 and 3) and the motor 22 can be operated in order to allow the playback of information at the surface of the disc 27.

In order to eject the disc 27, the door 23 is pivoted in the opening direction. During this movement and as previously described, the stop 40 acts on the ring 31 to force the clamping mechanism 30, 31, 32 to first take a tilting position opposite to that of the loading surface 26 and thus bring the disc 27 to the position illustrated at FIG. 2. At that time the shoulder 42 limits the downward movement of the disc 27. With the further opening of the door 23, the clamping mechanism 30, 31, 32 and the disc 27 return into a parallel plane with the loading surface 26, under the influence of their own weight. Simultaneously, the sliding member 70 actuated by the rod 66, has begun its translation motion, which in a first phase is slowed down by the resistance of the hair spring 82. The position of the stud 90 is such that it bears on the arm 92 of the lever 54 only after the return of the disc 27 into a plane parallel with the loading surface 26.

By further opening the door 23, the sliding member 70 bearing the stud 90 actuates the pivoting motion of the lever 54. At that time, the hair spring 82 passes its balanced position and in the further pivoting of the door, the hair spring 82 pushes on the stud 86 and thus increases the force causing the translation movement of the sliding member 70.

The stud 58 by contacting the edge of the disc 27, ensures its upward ejection motion, guided by the walls of the recess 44 and the small lips 46. The disc 27 is then in the position illustrated in FIGS. 4 and 5 and can be easily removed by the user. The device is ready to load and center another disc of any given diameter.

In the case of a large diameter disc 28, the operation of the device is as follows:

With the door open (FIGS. 4 and 5), the user places the disc 8 on the loading surface 26, the edge of the disc contacting the stud 60 and the guides 29. As previously described, during the closure of the door, the lever 54 pivots in a clockwise direction and brings the disc 28 into the position illustrated at FIG. 3; a fixed stud 98 limits the downward movement of the disc.

The disc 28 is then centered and clamped on the rotating spindle 21 (FIG. 1 and 3, disc in dashed line) and the motor 22 can be operated.

To eject the disc 28, the door 23 is firstly pivoted in the opening direction and the central hole 52 of the disc 28 after having slid on the cone on the motor spindle 21, comes to a rest on the studs 60 and 98.

As previously described, during its translation motion the sliding member 70 actuates the pivoting of the lever 54 by the arm 92 and this leads to the upward ejection movement of the disc 28 due to the combined action of the stud 60 and the guides 29, which ensures the desired vertical displacement.

The disc 28 is then brought into the position illustrated at FIGS. 4 and 5 and can be removed by the user, and the device is then ready to ensure the loading and centering of another disc.

As can be noticed in FIG. 4, the stud 58 has a length less than that of the stud 60 in order to avoid any contact with the surface of a large diameter disc 28.

It is apparent that the entire mechanism of the invention is confined in the available space between the surface 26 and the door protecting cover 25 and, therefore, the mechanism can be adapted to any kind of CD player as it does not extend into the existing space between the loading surface 26, the spindle 21 and pick up means (not illustrated in the figures for ease of understanding).

Furthermore, the space needed for integrating the mechanism of the present invention remains always smaller than the space necessary for the required motion of the clamping mechanism 30, 31, 32. This enables the incorporation of this invention into a standard door of a vertical CD player unit which accommodates only one size of disc, without requiring any significant modification to the size and thickness of the standard door.

What is claimed is:

1. A disc player/recorder apparatus comprising:
 a frame,
 a horizontal spindle on said frame adapted to receive a disc on one end of said spindle in a vertical operating plane, and
 a loading and centering device for discs of different diameters including:
 a loading member pivotally mounted to said frame for movement between an introduction position and an operating position, said member having a disc loading surface,
 guides on said loading surface which engage lateral edges of a disc of a first diameter or of a second smaller diameter and guide either diameter disc along different parallel loading planes to a location substantially centered laterally with respect to the end of the spindle,
 positioning elements on said loading surface which engage a lower edge of a disc of the first diameter or of the second diameter and position either diameter disc in a location substantially centered vertically with respect to the end of the spindle upon movement of said loading member between the introduction position and the operating position whereby the disc is translated between an introduction plane tilted upwardly and away from the vertical operating plane, and is returned to the introduction plane upon return movement of said loading member, and
 clamping means carried by said loading member for clamping a disc on the end of said spindle in the vertical operating plane when said member is in the operating position.

2. An apparatus according to claim 1, wherein said positioning elements include a disc retainer which retains a bottom edge of a disc upon the return movement of said member, and means carried by said member for forcing the disc to adopt momentarily a tilted position opposite to a tilted position of the disc loading surface at the beginning of the return movement of said member, said member being pivotally mounted to said frame for angular displacement of said loading surface.

3. An apparatus according to claim 2 wherein said disc retainer comprises a shoulder on said loading surface.

4. An apparatus according to claim 3, wherein said shoulder is a part of a recess in said loading surface and corresponding to the dimensions of a smaller diameter disc.

5. An apparatus according to claim 2 wherein said forcing means includes said clamping means.

6. An apparatus according to claim 5 wherein said clamping means includes a clamping magnet freely rotatable with respect to said loading member and a stop on said loading member located so that after a given angular displacement of said loading surface said clamping means returns the disc to a tilted position on said loading surface under the influence of its own weight.

7. An apparatus according to claim 6 further including an ejecting mechanism mounted on said loading member, said ejecting mechanism having a pivotally mounted lever with an extremity which cooperates with the lower edge of a disc in order to shift the position of the disc to and from its loading position.

8. An apparatus according to claim 7, said lever having at least two studs positioned at such a location that each of them engages and shifts a disc of a different diameter to and from the loading position.

9. An apparatus according to claim 7 wherein said ejecting mechanism includes an actuating means which moves said lever after the return of the disc by said clamping means to a tilted position on said surface.

10. An apparatus according to claim 9, wherein said actuating means includes a slide mounted on said loading member and a rod connected to said slide and attached to said frame for translating said slide responsive to angular movement of said loading member.

11. An apparatus according to claim 10, said actuating means including a damping element slowing down the translation of said slide when the clamping means and the disc reach a tilted position opposite to the tilted position of the disc loading surface.

12. An apparatus according to claim 10, said actuating means including a biasing element reinforcing the translation of the slide after the return of the disc to a tilted position on the disc loading surface.

13. An apparatus according to claim 12 wherein said damping element and said biasing element comprises a resilient hair spring.

14. A disc player/recorder apparatus comprising:
a frame,
a horizontal spindle on said frame adapted to receive a disc on one end of said spindle in a vertical operating plane, and
a loading, ejecting and centering device for discs of different diameters including:
a loading door pivotally mounted to said frame for angular movement between an introduction position and an operating position, said loading door having a disc loading surface,
guides on said loading surface which engage lateral edges of a disc of a first diameter or of a second smaller diameter and guide either diameter disc along different parallel loading/ejecting planes to a location substantially centered laterally with respect to the end of the spindle,
positioning elements including movable studs operatively connected to said base and arranged on said loading surface, which elements engage a lower edge of a disc of the first diameter or of the second diameter and position either diameter disc in a location substantially centered vertically with respect to the end of the spindle responsive to movement of said loading door between the introduction position and the operating position whereby the disc is lowered and guided along said loading surface and along its respective loading plane from a loading position tilted upwardly and away from the vertical operating plane and is simultaneously displaced angularly to the end of said spindle and the vertical operating plane, and is ejected from the end of said spindle to the loading position responsive to return movement of said member to the introduction position, and
clamping means carried by said loading member for clamping a disc on the end of said spindle in the vertical operating plane when said member is in the operating position.

15. An apparatus according to claim 14, said ejecting mechanism having a pivotally mounted ever with an extremity which cooperates with the lower edge of a disc in order to shift the position of the disc to and from its loading position.

16. An apparatus according to claim 15, said lever having at least two studs positioned at such a location that each of them engages and shifts a disc of a different diameter to and from the loading position.

17. An apparatus according to claim 14, wherein said positioning elements include a disc retainer which retains a bottom edge of a disc upon the return movement of said member, and means carried by said member for forcing the disc to adopt momentarily a tilted position opposite to a tilted position of the disc loading surface at the beginning of the return movement of said loading door.

18. An apparatus according to claim 17 wherein said forcing means includes said clamping means.

19. An apparatus according to claim 18 wherein said clamping means includes a clamping magnet freely rotatable with respect to said loading member and a stop on said loading member located so that after a given angular displacement of said loading surface said clamping means returns the disc to a tilted position on said loading surface under the influence of its own weight.

20. An apparatus according to claim 17 wherein said disc retainer comprises a shoulder on said loading surface.

21. An apparatus according to claim 17, wherein said shoulder is a part of a recess in said loading surface and corresponding to the dimensions of a smaller diameter disc.

22. An apparatus according to claim 17 wherein said ejecting mechanism includes an actuating means which moves said lever after the return of the disc by said clamping means to a tilted position on said surface.

23. An apparatus according to claim 22 wherein said actuating means includes a slide mounted on said loading member and a rod connected to said slide and attached to said frame for translating said slide responsive to angular movement of said loading member.

24. A disc player/recorder apparatus comprising:
a frame,
a horizontal spindle on said frame adapted to receive a disc on one end of said spindle in a vertical operating plane, and
a loading, ejecting and centering device for discs including:
a loading member pivotally mounted to said frame for movement between an introduction position and an operating position, said loading member having a disc loading surface,
guides on said loading surface which engage lateral edges of a disc and guide the disc to a location substantially centered laterally with respect to the end of the spindle,
positioning elements including movable studs operatively connected to said base and arranged on said loading surface, which elements engage a lower edge of a disc and position the disc in a location substantially centered vertically with respect to the end of the spindle responsive to movement of said loading member between the introduction position and the operating position whereby the disc is lowered and guided along said loading surface from a loading position tilted upwardly and away from the vertical operating plane and is simultaneously displaced angularly to the end of said spindle and the vertical operating plane and is returned to the introduction plane upon return movement of said loading member, and is ejected from the end of said spindle to the loading position responsive to return movement of said member to the introduction position, and
clamping means carried by said loading member for clamping a disc on the end of said spindle in the vertical operating plane when said member is in the operating position.

* * * * *

UNITED STATES PATENT AND TRADEMARK OFFICE
CERTIFICATE OF CORRECTION

PATENT NO. : 5,010,428

DATED : April 23, 1991

INVENTOR(S) : Stephane M. d'Alayer de Costemore d'Arc

It is certified that error appears in the above-identified patent and that said Letters Patent is hereby corrected as shown below:

Title Page:
Item no. [75], Inventor, change "Stephane M. d'Alayerde Costemore d'Arc" to --Stephane M. d'Alayer de Costemore d'Arc--.

Column 7, line 56, change "ever" to --lever--.

Column 8, line 26, after "22" insert --,--.

Signed and Sealed this

Fourth Day of May, 1993

Attest:

MICHAEL K. KIRK

Attesting Officer

Acting Commissioner of Patents and Trademarks